(12) United States Patent
Groenendijk et al.

(10) Patent No.: US 9,712,415 B2
(45) Date of Patent: Jul. 18, 2017

(54) METHOD, APPARATUS AND COMMUNICATION NETWORK FOR ROOT CAUSE ANALYSIS

(75) Inventors: Jan Groenendijk, Athlone (IE); Johan Christer Wilhelm Granath, Stockholm (SE); Yangcheng Huang, Athlone (IE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 207 days.

(21) Appl. No.: 14/348,862

(22) PCT Filed: Sep. 30, 2011

(86) PCT No.: PCT/EP2011/067104
§ 371 (c)(1),
(2), (4) Date: Jul. 14, 2014

(87) PCT Pub. No.: WO2013/044974
PCT Pub. Date: Apr. 4, 2013

(65) Prior Publication Data
US 2014/0321311 A1   Oct. 30, 2014

(51) Int. Cl.
*H04W 4/00* (2009.01)
*H04L 12/26* (2006.01)
*H04L 12/24* (2006.01)

(52) U.S. Cl.
CPC ...... *H04L 43/0876* (2013.01); *H04L 41/0631* (2013.01); *H04L 41/12* (2013.01); *H04L 41/5035* (2013.01); *H04L 41/16* (2013.01)

(58) Field of Classification Search
CPC ..... H04L 29/06; H04L 12/2602; H04L 43/00; H04L 63/1408; H04L 67/1002;
(Continued)

(56) References Cited

U.S. PATENT DOCUMENTS

| 7,558,240 B2 * | 7/2009 | Chen ............... H04L 12/4633 370/328 |
| 7,583,587 B2 | 9/2009 | Qiu et al. |

(Continued)

FOREIGN PATENT DOCUMENTS

| CN | 1665205 A | 9/2005 |
| CN | 101489301 A | 7/2009 |

(Continued)

OTHER PUBLICATIONS

Notification of Reasons for Rejection dated Apr. 21, 2015, issued in Japanese Patent Application No. 2014-532255, 3 pages.
(Continued)

*Primary Examiner* — Sai Aung
(74) *Attorney, Agent, or Firm* — Rothwell, Figg, Ernst & Manbeck, P.C.

(57) ABSTRACT

There is provided a method (100) for root cause analysis of service quality degradation in a communications network. The method comprises receiving (102) measurements from a plurality of nodes in the communication network, determining (104) identifiers for the received measurements, using (106) the identifiers for the received measurements to determine a network topology; and performing (108) root cause analysis based on the determined topology and the measurements linked with said topology.

22 Claims, 11 Drawing Sheets

(58) Field of Classification Search
CPC ............... H04L 69/22; H04L 63/0823; H04L 29/06027; H04L 63/1433; H04L 63/166; H04L 69/329

See application file for complete search history.

(56) References Cited

U.S. PATENT DOCUMENTS

| | | | |
|---|---|---|---|
| 7,836,169 B2 | 11/2010 | Satyanarayanan et al. | |
| 8,028,199 B1 | 9/2011 | Guruprasad et al. | |
| 2003/0091165 A1 | 5/2003 | Bearden et al. | |
| 2006/0019668 A1* | 1/2006 | Kraiem | H04L 12/40078 455/446 |
| 2007/0230361 A1* | 10/2007 | Choudhury | H04L 12/2602 370/250 |
| 2008/0049634 A1* | 2/2008 | Goyal | H04L 12/2697 370/252 |
| 2009/0010204 A1* | 1/2009 | Pratt, Jr. | G01D 21/00 370/328 |
| 2009/0116404 A1* | 5/2009 | Mahop | H04L 41/0213 370/254 |
| 2010/0198730 A1* | 8/2010 | Ahmed | G06F 17/30528 705/50 |
| 2011/0090796 A1* | 4/2011 | Bedair | H04L 65/1053 370/235 |
| 2011/0090853 A1* | 4/2011 | Chandramouli | H04W 28/10 370/329 |

FOREIGN PATENT DOCUMENTS

| | | |
|---|---|---|
| CN | 101584185 A | 11/2009 |
| CN | 101945009 A | 1/2011 |
| EP | 1 508 997 A2 | 2/2005 |
| JP | 2008271088 A | 11/2008 |
| JP | 2010245877 A | 10/2010 |
| WO | 2008121062 A1 | 10/2008 |
| WO | 2010001795 A1 | 1/2010 |

OTHER PUBLICATIONS

Notice of Preliminary Rejection dated May 13, 2015, issued in Korean Patent Application No. 10-2014-7008360, 7 pages.
Fujitsu "Network Sensing—Network Monitoring and Diagnosis Technologies" vol. 60, No. 4, 2009, 8 pages.
Ericsson White Paper "Keeping the Customer Service Experience Promise" 2011, 9 pages.
Hedayat et al. "A Two-Way Active Measurement Protocol (TWAMP)" Network Working Group, Request for Comments: 2008, 22 pages.
Shalunov et al. "A One-way Active Measurement Protocol (OWAMP)" Network Working Group, Request for Comments: 2006, 47 pages.
Holm-Öste et al. "Ericsson's User Service Performance framework" Ericsson Review No. 1, 2008, pp. 43-46.
Morton et al. "Framework for Metric Composition" Internet Engineering Task Force (IETF), Request for Comments: 2010, 15 pages.
Chinese Search Report dated May 25, 2016, in Chinese Application No. 201180075229.6, 2 pages.
Second Office Action dated Dec. 30, 2016, in corresponding Chinese application No. 201180075229.6 with English translation, 13 pages.

* cited by examiner

METHOD, APPARATUS AND COMMUNICATION NETWORK FOR ROOT CAUSE ANALYSIS

CROSS REFERENCE TO RELATED APPLICATION(S)

This application is a 35 U.S.C. §371 National Phase Entry Application from PCT/EP2011/067104, filed Sep. 30, 2011, designating the United States, the disclosure of which is incorporated herein in its entirety by reference.

TECHNICAL FIELD

The invention relates to methods and apparatus for root cause analysis, in particular it relates to methods and apparatus for root cause analysis of service quality degradation in a communications network.

BACKGROUND

One of the primary responsibilities of service providers is to ensure that their services provide a level of performance and robustness that satisfies the commitments specified in their service level agreements (SLAs) with customers. A standard approach is to monitor the quality and behaviour of the services by measuring system-internal performance characteristics (such as round trip delay, available bandwidth and loss ratio), identify unusual or anomalous activity that either directly indicates or indirectly implies that the service is no longer behaving satisfactorily. These measurements allow for detection of quality degradation or functional loss. Additionally a service root cause analysis (S-rca) can be used to analyze (root) causes of service performance degradations, in order to identify the reason for a fault that resulted in the quality degradation or functional loss.

To obtain this measurement information a service assurance function must rely on detailed event reporting from network resources, particularly of measurement events.

As network nodes generate a massive number of measurement events, it is impractical to collect all event data in a central database for future correlation and analysis. Subsequently, intelligent filtering and aggregation must be applied to reduce the amount of data, while still allowing for drill-down.

In terms of measurements, numerous measurement systems have been proposed and implemented. One way to classify measurement methods is to distinguish between active and passive approaches.

Active measurements involve injection of traffic into the network in order to probe certain network devices (such as PING) or to measure network properties such as round-trip time (RTT), one-way delay and available bandwidth. The results from active measurements are generally easy to interpret. However, the injected traffic may affect the network under test.

Passive measurements, either software-based or hardware-based, simply observe existing network traffic and are non-intrusive, or at least provide very little intrusion into the network under test. Network traffic may be tapped at a specific location and can be recorded and processed at different levels of granularity, from complete packet level traces to statistical figures. The results from passive measurements are often hard to interpret but have the benefits of not affecting the network under test.

Measurements can also be performed on different system/protocol layers, for example following an Open Systems Interconnection (OSI) model, including link layer, network layer, transport layer and even application layer. Existing measurement systems mainly consider network and transport layers due to privacy and legal concerns.

Measurements collected on different layers may present varied levels of granularity, from complete packet level traces to statistical figures. Measurements with the coarsest granularity are traffic counters, i.e. cumulated traffic statistics, such as packet volume and counts. Another common practice is use flow level statistics from NetFlow (Cisco) and sFlow, containing traffic volume information of a specific flow.

Despite network-wide measurement and performance estimation, the measurement systems known in the art usually take little consideration on compatibility or interoperability. These systems are usually stand-alone, use different performance metrics, employ various underlying measurement mechanisms, and often operate off-line only. Though diverse in underlying mechanisms, these systems have the common goal of providing system-internal characteristics to applications, and their measurements overlap significantly.

There are various disadvantages with the existing solutions. For example, the existing solutions do not take into account that the network equipment has implicit knowledge about relations between measurements related through their Resource Service (ReSe) relation. Further, existing solutions continuously process all measurements to capture relations and aggregate measurements therefore loosing valuable information that could be used for trouble shooting. Furthermore, existing solutions rely on unstructured network measurements and thus try to make the best out of the situation. The lack of meta data in counters makes it very hard to correlate measurements from different resources especially on session level.

SUMMARY

It is an aim of embodiments of the present invention to provide a method and apparatus for root cause analysis, that obviate or reduce at least one or more of the disadvantages mentioned above.

According to a first aspect of the invention there is provided a method for root cause analysis of service quality degradation in a communications network. The method comprising receiving measurements from a plurality of nodes in the communication network and determining identifiers for the received measurements. The method further comprises using the identifiers for the received measurements to determine a network topology and performing root cause analysis based on the determined topology and the measurements linked with said topology.

According to another aspect of the invention, there is provided an apparatus for providing root cause analysis of service quality degradation in a communications network. The apparatus comprises an adapter arranged to receive measurements from a plurality of nodes in the communications network, and arranged to determine identifiers for the received measurements. The apparatus further comprises a measurement processor arranged to use the identifiers for the received measurements to determine a network topology and a root cause analyser arranged to perform root cause analysis based on the determined topology and the measurements linked with said topology.

According to another aspect of the invention, there is provided a communication network, comprising a plurality of nodes and an apparatus for providing root cause analysis.

The apparatus comprising an adapter arranged to receive measurements from a plurality of nodes in the communications network, and arranged to determine identifiers for the received measurements. The apparatus further comprises a measurement processor arranged to use the identifiers for the received measurements to determine a network topology and a root cause analyser arranged to perform root cause analysis based on the determined topology and the measurements linked with said topology.

BRIEF DESCRIPTION OF THE DRAWINGS

For a better understanding of the present invention, and to show more clearly how it may be carried into effect, reference will now be made, by way of example only, to the following drawings in which.

DETAILED DESCRIPTION

A User Service Performance (USP) concept has been proposed which provides a service and technology generic approach to service quality measurement as well as defining a measurement structure to support root cause analysis. See for example WO2008/121062. In the USP concept, system services and resource services are considered. System services, which include web browsing, streaming and television, are defined as technology-independent and as possible for an end user to experience. This end user, which can be either a person or a machine, consumes the service through a terminal such as a mobile phone, a screen or a camera. Resource services, on the other hand, are logical or physical entities that combine to deliver system services, and are based on resources such as bearers, links and nodes.

The performance of both system services and resource services is characterized by Key Performance Indicators. Service Key Performance Indicators (S-KPIs) and Resource Key Performance Indicators (R-KPIs) offer an insight into one of three quality metric groups: accessibility, which is the system's ability to provide a service upon the user's request; integrity, which is the quality of the service as perceived by the user; and retainability, which is the system's ability to provide a service session that is as long as the user needs it to be.

The USP concept provides the ability to identify and prioritize the S-KPIs from a user perspective, and to drill down and identify which resource services are responsible for S-KPI degradation.

Embodiments of the present invention provide service root cause analysis (S-RCA) in a communication network which continuously processes measurement reports collected from multiple layers of the monitored network.

Figure 1:
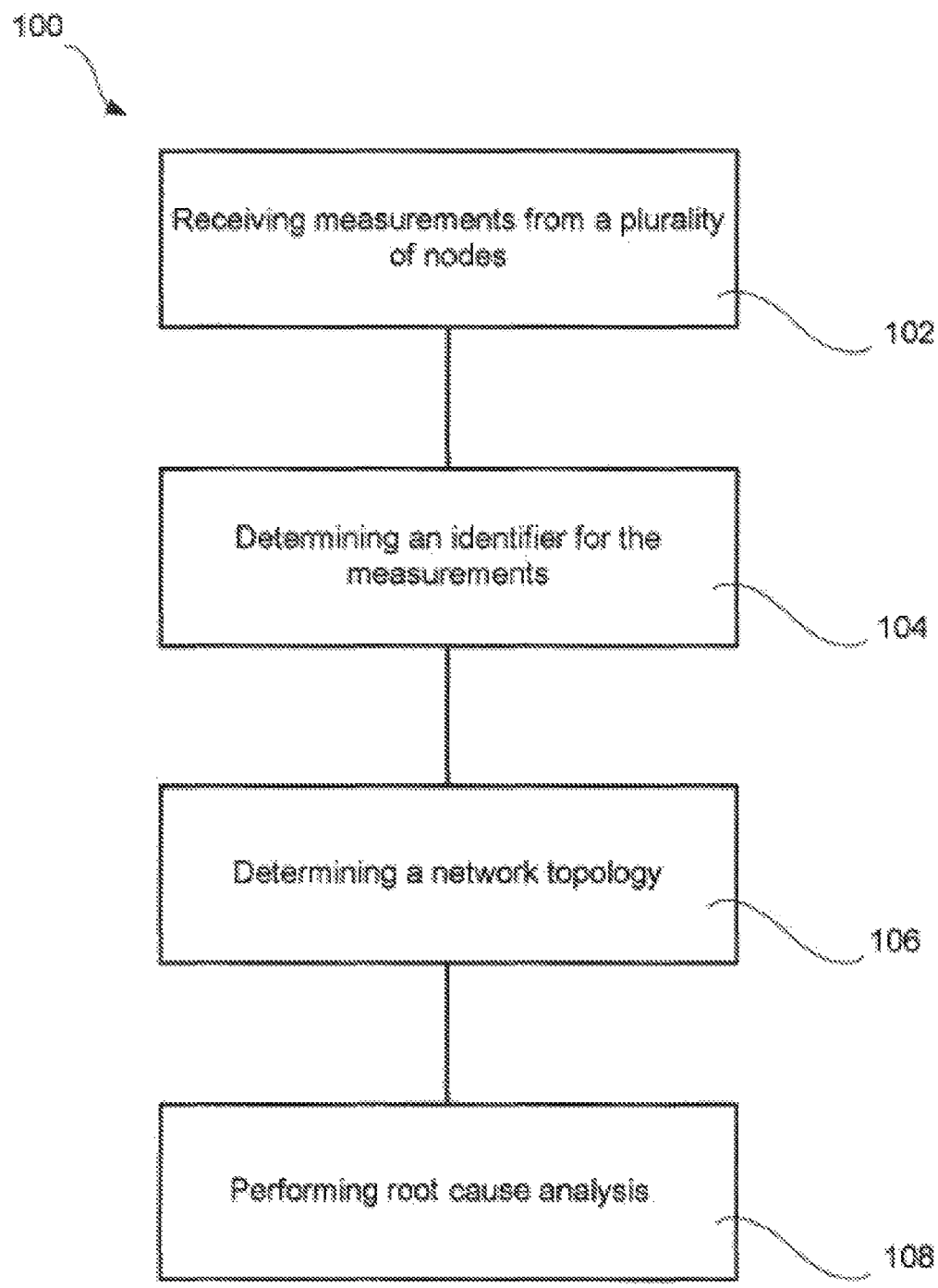
FIG. 1 shows the steps performed by an embodiment of the present invention.

FIG. 1 shows a method 100 of performing root cause analysis in a communication network comprising a plurality of nodes, in accordance with an embodiment of the present invention.

Step 102 comprises receiving measurements from a plurality of nodes in the communication network. Each measurement may be related to an R-KPI, for use in root cause analysis.

These measurements may be system-internal performance characteristics (such as round trip delay, available bandwidth and loss ratio). The measurements may be active measurements, or passive measurements.

The measurements may be provided by measurement systems in the communications network that may be integral to the nodes or that may be external to the nodes.

Each measurement report may include a time stamp, user and session identifier and other parameters allowing the management system to correlate different events and follow service sessions across the network.

In one embodiment the measurements are received in an information structure, which, for a data path of a connection, represents logical and physical connectivity resource services involved in said connection. Alternatively or in addition, measurements are received in an information structure, which, for a control path of a connection, represents logical and physical connectivity and control function resource services involved in said connection.

Step 104 comprises determining identifiers for the received measurements. An identifier may be determined for each of the received measurements, or, alternatively, an identifier may be determined for only some of the received measurements. If a measurement does not have an identifier determined, this measurement is not used in embodiments of the present invention.

In an embodiment of the invention, an identifier may be determined for one measurement and this identifier may be used for other similar measurements, in order to minimize processing, increase speed and decrease costs.

Step 106 comprises determining the network topology by using the identifiers for the received measurements. The identifiers comprise pointers to connection objects and by analysing the identifiers it is possible to determine topology of the network.

The network topology that is determined comprises information about network nodes and physical links connecting the nodes. Additionally, in alternative embodiments the network topology also includes information about terminals connected to the network, logical links between the nodes or terminals (node to node, terminal to node, terminal to terminal) as well as services executed in the network.

In an embodiment of the present invention, the identifier may be a Resource Service (ReSe) identifier, which when linked to a network topology, identifies to which resource service the measurement belongs. The identifier may be a User Plane Reference identifier, which identifies the relation between the user plane and the control plane. The identifier may also identify related resource services that are associated with supporting an end user session.

In step 106 nodes and network paths are identified that participate in a monitored System Service or end user service delivery, in order to infer resource service paths (and path segments) related to the particular service delivery, by using the identifiers for the received measurements to determine a topology of the network.

In some embodiments determining the network topology from the identifiers to identify paths participating in the monitored services is complemented by looking up traffic forwarding tables (such as routing tables and MPLS label switching tables) based on identifiers and IP addresses. Measurements are linked along the inferred resource service paths based on their identifiers.

Figure 2:
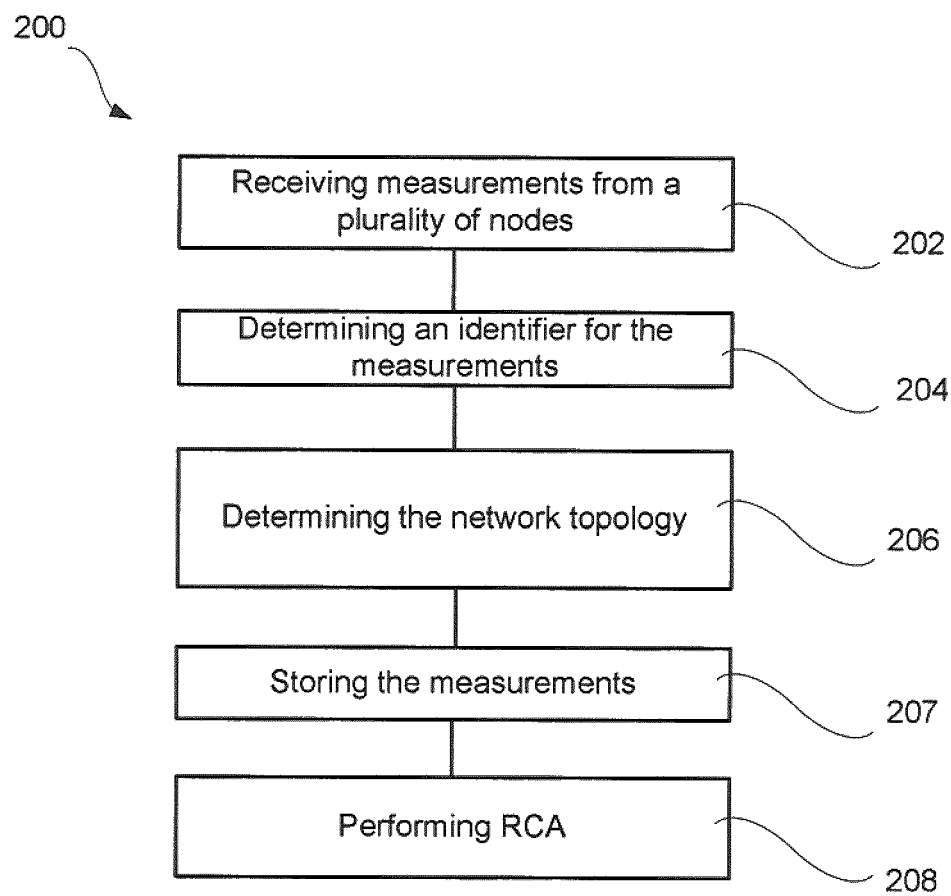
FIG. 2 shows the steps performed by another embodiment of the present invention.

Although not shown in FIG. 2, there is also the optional step of obtaining a measurement report for at least one measurement, this measurement report may be associated with a measurement event and may contain the identifier and other information associated with the measurement. The measurement report will be described in more detail below in relation to FIGS. 11 and 12.

Step 108 comprises performing root cause analysis based on the measurements. Root cause analysis is performed to identify that resource service(s) that has the most negative impact on the combined resulting experienced service quality, as experienced by an end user.

The reasoning logic in the root cause analysis may be implemented in many different ways. In particular, at least a measurement based decision tree or Bayesian inference may be implemented.

A measurement based decision tree, for example, allows operators to assign a priority value for each link between measurements. A decision-tree like diagnosis graph is therefore formed based on the linked measurements. The higher the priority value is, the stronger the operator believes the measurement (and the corresponding network entity the identifier is pointing to) to be the root cause. The reason logic can simply search through the linked measurements and identify the leaf nodes with the maximum priority. In case that there is equal priority between different leaf nodes, all of them shall be output as joint root causes.

FIG. 2 shows a method 200 according to another embodiment of the present invention. In the method of FIG. 2, the method steps 202, 204, 206 and 208 correspond to the above described method steps 102, 104, 106, 108 of FIG. 1, respectively. The method 200 of FIG. 2 differs from the method 100 of FIG. 1 in that it includes the additional step 207 of storing the measurements prior to root cause analysis being performed. The step 206 of determining a network topology involves, in various embodiments, operations illustrated in FIGS. 5 and 6.

Figure 3:
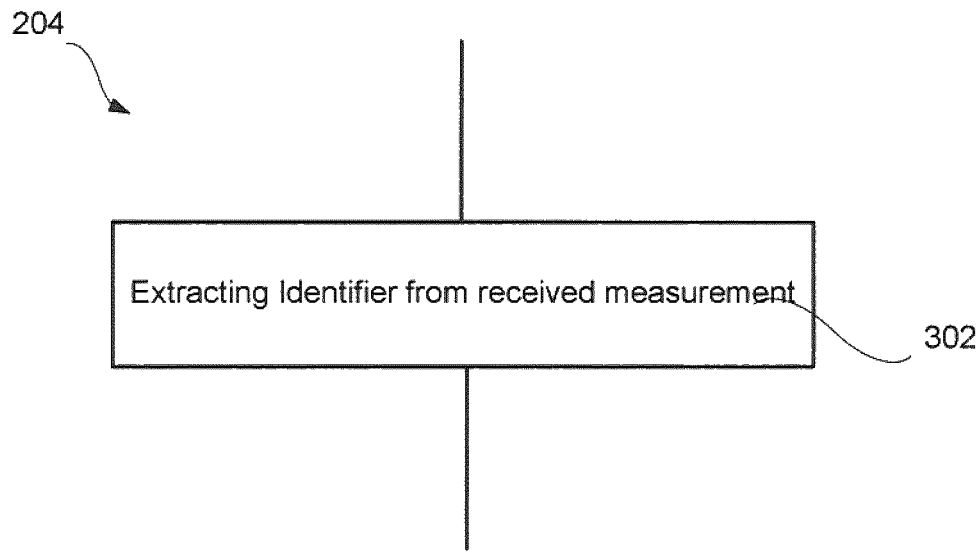
FIG. 3 shows step 204 of FIG. 2 according an embodiment of the invention.

FIG. 3 shows step 204 of FIG. 2 according to an embodiment of the present invention. In FIG. 3, the step of determining an identifier comprises the step 302 of extracting the identifier from the received measurement. In other words, in an embodiment of the present invention, a measurement is received from a node with an embedded identifier, and the identifier is determined by extraction from within the measurement. In one embodiment the operation of extracting the identifier comprises reading metadata associated with the received measurement.

Figure 4:
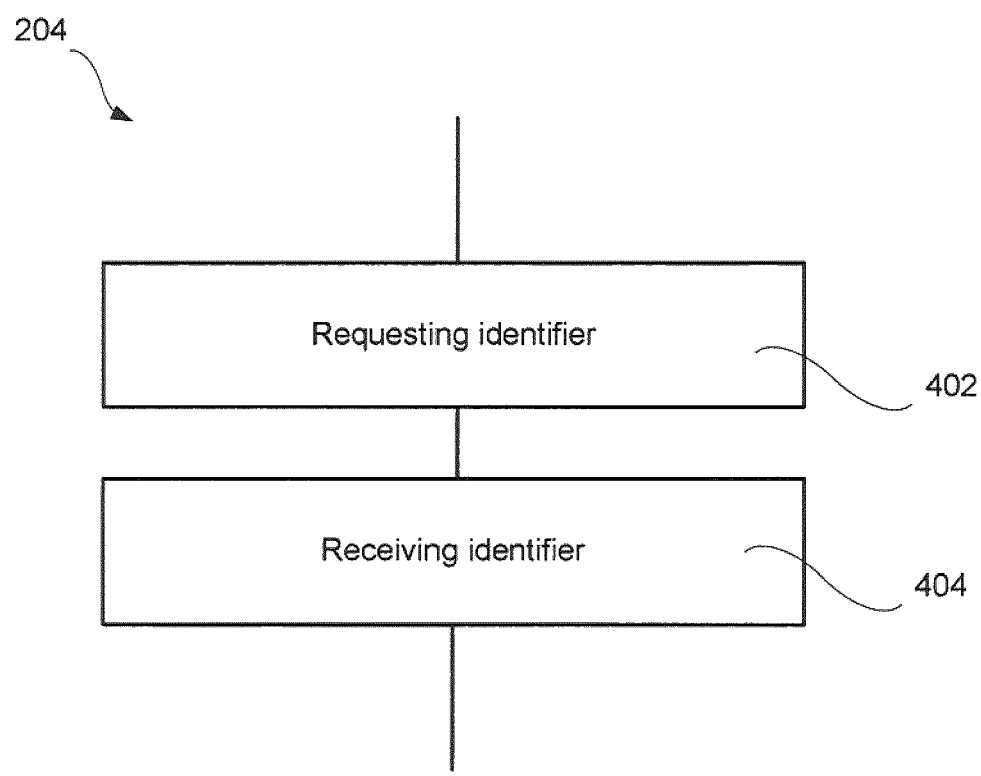
FIG. 4 shows step 204 of FIG. 2 according another embodiment of the invention.

FIG. 4 shows step 204 of FIG. 2 according to another embodiment of the present invention. In FIG. 4, the step of determining an identifier comprises the step 402 of requesting the identifier and the step 404 of receiving the identifier. In this embodiment, the identifier is not embedded within the measurements received from a node. In this embodiment, the measurement is received and upon reception of the measurement, the identifier is requested from the node that issued the measurement. The node receives the request for the identifier and transmits the identifier.

As shown in FIGS. 3 and 4, there are two methods in which the identifier is determined for a particular measurement. The first method involves extracting the identifier from the measurement itself and the second method involves requesting the identifier from the node that issued the measurement.

Figure 5:
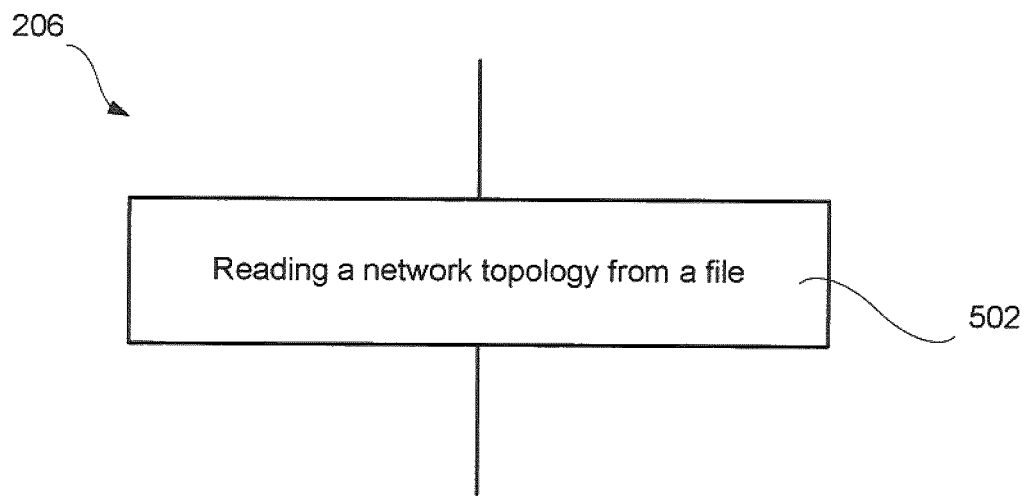
FIG. 5 shows step 206 of FIG. 2 according an embodiment of the invention.

FIG. 5 shows step 206 of FIG. 2 according to an embodiment of the present invention. In FIG. 5, the step of determining a network topology for root cause analysis comprises reading 502 information about part of a network topology from a file. In some embodiments it may be advantageous to complement the network topology determined based on the received measurements and their associated identifiers with information about part of network topology that can be read from a file, stored for example in a network management system. This may be particularly applicable to sections of a network from which no measurements are received.

Figure 6:
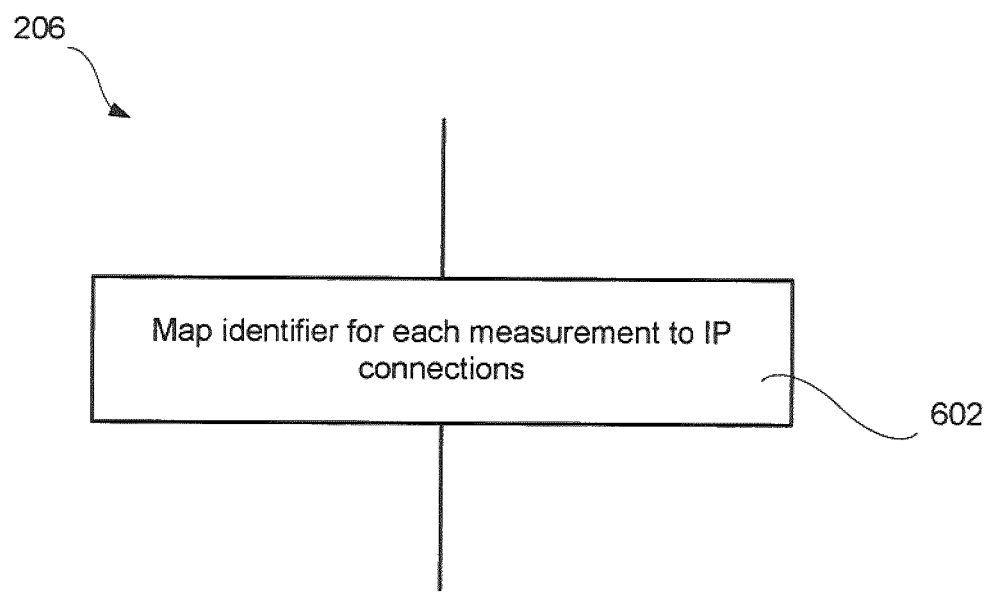
FIG. 6 shows step 206 of FIG. 2 according another embodiment of the invention.

In this embodiment, it is not necessary to determine a network topology each time RCA is performed. Further, any changes to the network topology can be reflected in the stored network topology by updating the stored network topology FIG. 6 shows step 206 of FIG. 2 according to another embodiment of the present invention. In FIG. 6, the step of determining a network topology for root cause analysis comprises mapping the identifier to the measurement to IP connections. In alternative embodiments, in different types of networks, the identifiers are mapped to packet switched and/or circuit switched connections.

It should be noted that although the method step 204 and 206 are shown as separate steps, these steps may be considered as a single step. In other words, the determining of the identifier and the determining of the network topology may be carried out concurrently.

Figure 7:
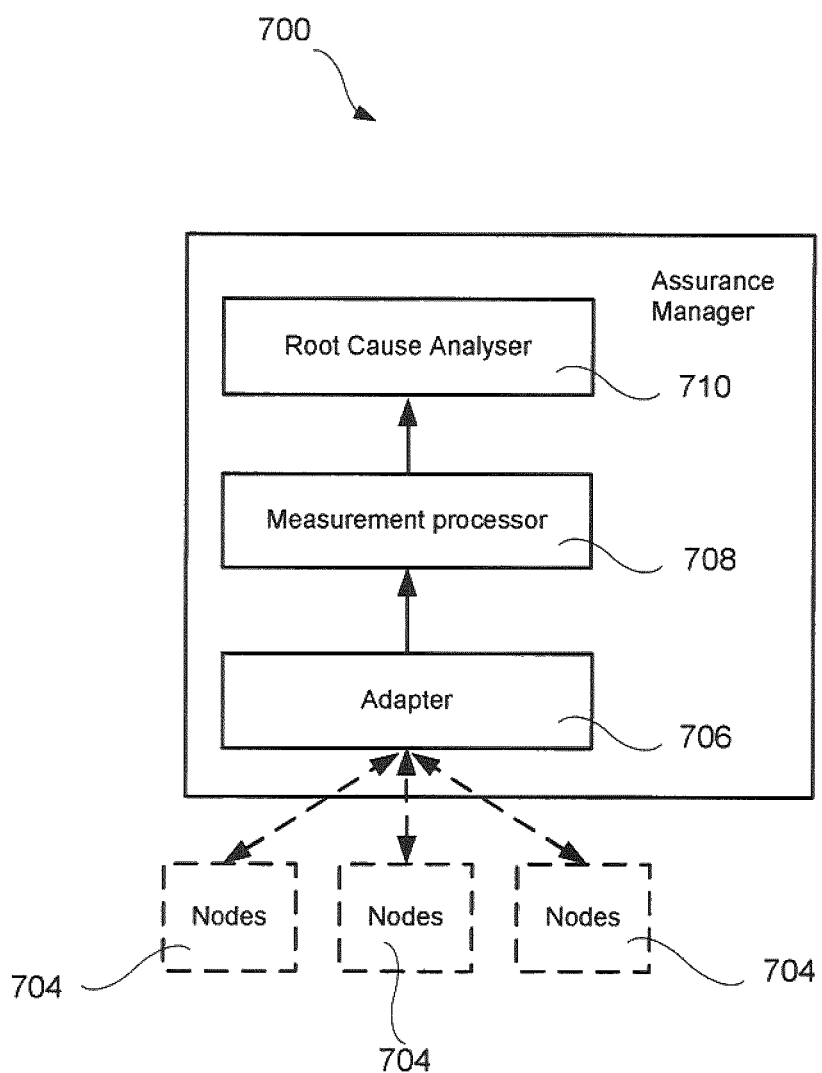
FIG. 7 shows an apparatus according to an embodiment of the present invention.

FIG. 7 shows an apparatus 700 according to an embodiment of the present invention, which is arranged to implement the root cause analysis methods as described in relation to FIGS. 1 to 6.

Apparatus 700, which may also be referred to as an assurance manager, comprises an adapter 706 arranged to receive measurements from a plurality of nodes 704 in a communication network. The plurality of nodes 704 are shown with a dashed line to signify that they do not form part of the apparatus 700, but are located as part of a communication network that also includes the apparatus 700.

The adapter 706 is arranged to determine an identifier for the received measurements. The adapter may receive a measurement from all or some of the plurality of nodes and may determine an identifier for at least some of the received measurements. If a measurement does not have an identifier determined, this measurement is not used in embodiments of the present invention. In other words, the adapter is arranged to perform the method steps 102 and 104 of FIG. 1.

Apparatus 700 further comprises a measurement processor 708 that is arranged to determine the network topology by using the identifiers for the received measurements. In other words, the measurement processor 708 is arranged to perform the method step 106 of FIG. 1.

Apparatus 700 further comprises a root cause analyser 710 arranged to perform root cause analysis based on the measurements. In other words, the root cause analyser 710 is arranged to perform the method step 108 of FIG. 1.

The root cause analyser 710 may be arranged to implement reasoning logic for the root cause analysis in many different ways. In particular, the root cause analyser 710 may be arranged to implement root cause analysis based on at least a measurement based decision tree or Bayesian inference.

Figure 8:
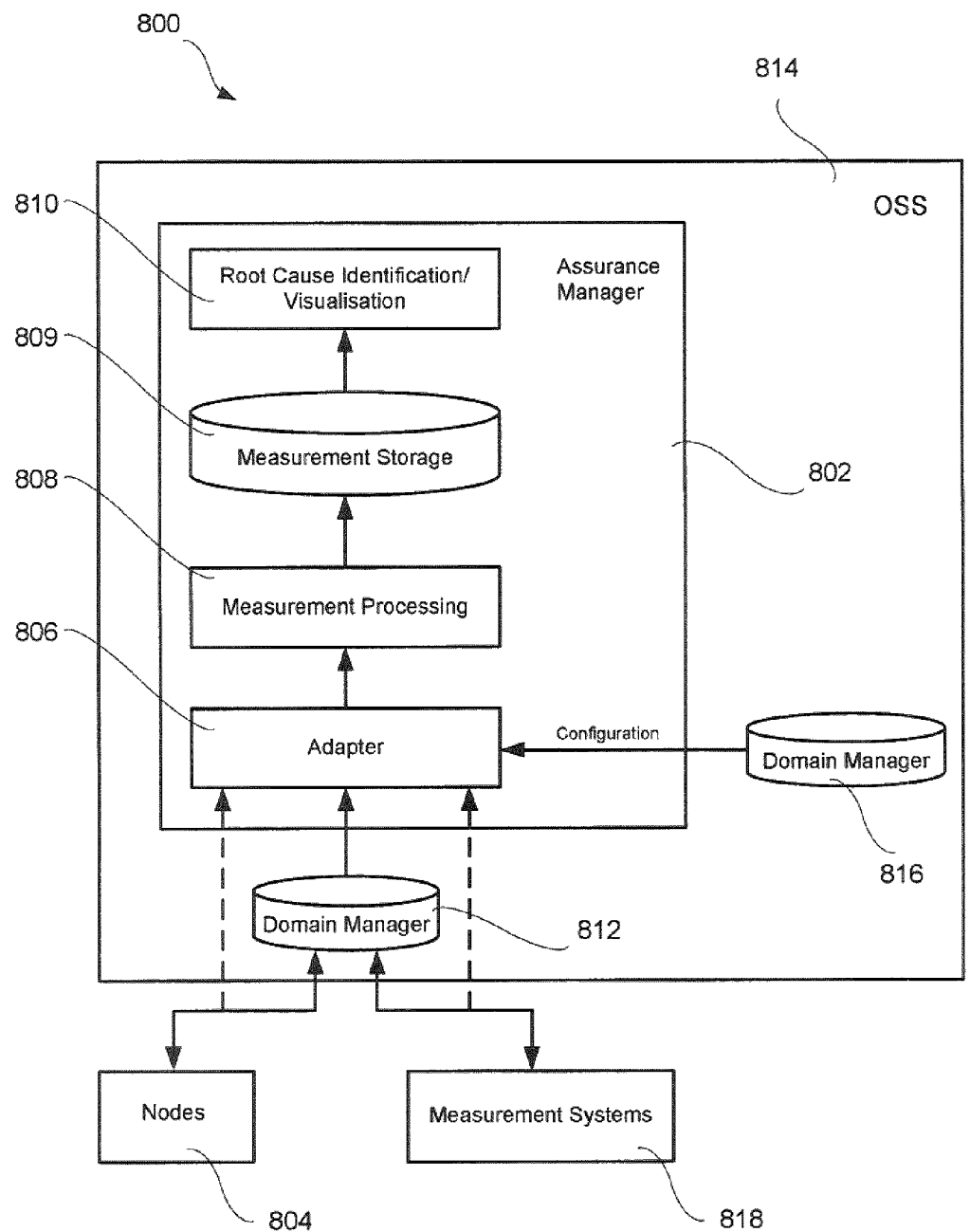
FIG. 8 shows an apparatus according to another embodiment of the present invention.

FIG. 8 shows an apparatus 800 according to another embodiment of the present invention. Apparatus 800 comprises an assurance manager 802 that is provided in an operations support system (OSS) 814.

A plurality of nodes 804 are provided within a communications network. One or more measurement systems 818 are also provided. Each node may have at least one associated measurement system, which may be provided integrally to the node. The measurement systems provide measurements associated with the nodes 84 for transmission to the assurance manager 802.

The at least one measurement system 818 may be provided centrally in the communications network and may be arranged to centrally provide measurements associated with the nodes 804 to the assurance manager 802.

The nodes 804 and measurement systems 818 may communicate with the assurance manager 802 via a domain manager 812, or they may communicate directly with the assurance manager, bypassing the domain manager 812.

The RCA algorithm implemented in the root cause analyser 710, 810 identifies one or more resource service causing degradation of a service. Once the offending resource(s) is identified a repair operation may be initiated.

In the apparatus 800, the adapter 806 is arranged to receive measurements from the measurement system 818 associated with the plurality of nodes 804. The adapter 806 is further arranged to determine an identifier for at least some of the measurements.

A domain manager 816 may be provided that is arranged to store a file that contains information about part of a topology of the network. In some embodiments it may be advantageous to complement the network topology determined based on the received measurements and their associated identifiers with information about part of network topology that can be read from a file. In an embodiment of the present invention, the adapter 806 may be arranged to determine the network topology by reading the topology from a file stored in the domain manager 816.

It should be noted that the file containing the topology of the network may be stored in a location in the apparatus other than in the domain manager 816. For example, the file may be stored within in the network management system, the assurance manager 802, or at any other suitable location with the OSS 814.

The domain manager 816 may also be arranged to collect and terminate measurement event flows from nodes and/or other measurement systems, and then make the measurement available for the root cause analyser 810 for root cause analysis.

Figure 9:
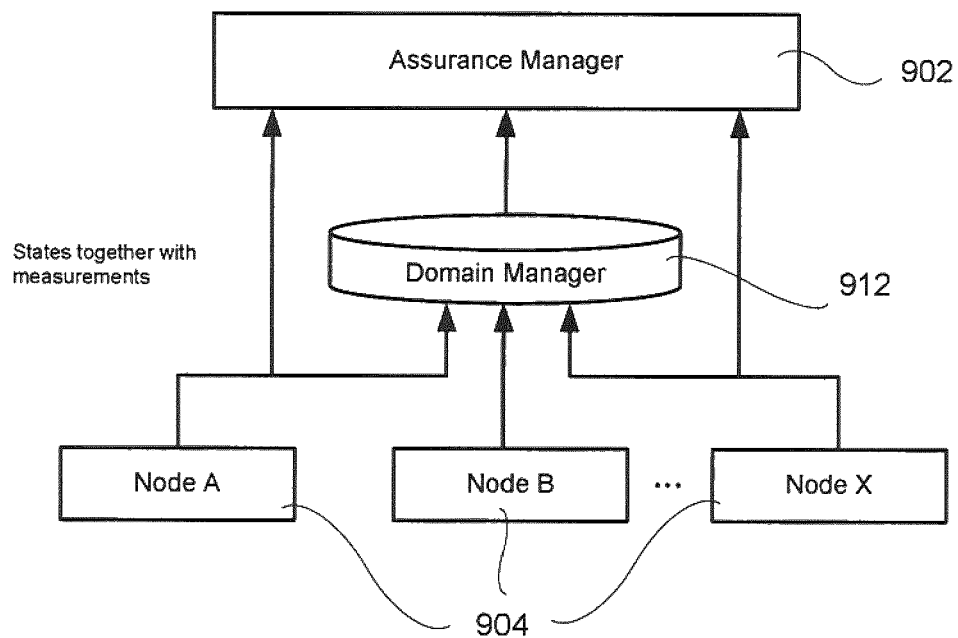
FIG. 9 shows an embodiment in which the identifier is transmitted with the measurements from the nodes.

FIG. 9 shows an embodiment in which the identifier is transmitted with the measurements from the nodes. As shown in FIG. 9, states together with measurements are transmitted from the plurality of nodes 904 to the assurance manager 902, either via the domain manager 912, or not.

In FIG. 9, the mapping between identifiers is sent by nodes, together with measurements, in the defined measurements. The node has the identifiers through the process of resource request/acknowledgement. The state propagation can be either periodic (for example, every minute) based on a pre-defined interval, or on-demand (i.e. sending state updates whenever changes occur).

The adapter 806 in the assurance manager 802 may be arranged to extract the identifier and the mapping between the identifiers from the measurements.

A network topology, that is determined based on the mapping between the identifiers, may be stored in a file in the domain manager 816, or at any other suitable location with the OSS 814. Instead of sending a full mapping between identifiers and IP connections (or, in general, packet switched and/or circuit switched connections) nodes may only include changes to the mapping in updates. In this case, only changes to the mapping will be received from the nodes and the network topology stored in the file may be updated accordingly. This provides the advantage of allowing the processing time of the measured events to be reduced as the there is a stored network topology, which can be updated according to any changes.

Network topology is one type of dependency instance. A dependency model may be calculated based on collected measurements and may be generic, i.e. describing dependency relations between any two entities in the communications network.

Figure 10:
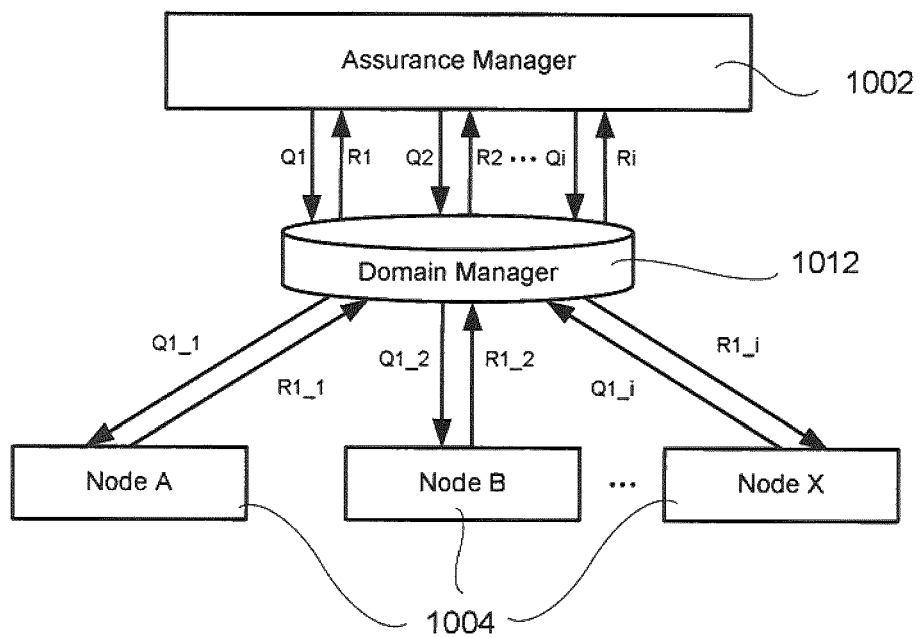
FIG. 10 shows an embodiment in which the identifier is requested from the nodes.

FIG. 10 shows an embodiment in which the identifier is requested from the nodes. As shown in FIG. 10, the assurance manager 1002 is arranged to transmit a query to the plurality of nodes 1004 via the domain manager 1012. The nodes 1004 receive the request for the identifier from the domain manager 1012 and transmit responses to the assurance manager 1002 via the domain manager 1012. In this embodiment, the identifiers are requested from the nodes to which the measurements are associated.

In FIG. 10, queries are issued to nodes or the OSS for the mapping between identifiers. In each query, a list of identifiers is included as query criteria. Queries might be issued to multiple nodes in parallel to reduce latency.

The query process may continue recursively, where the nodes receiving query messages retrieve the matching tuples (consisting of identifier mappings) and recursively traverse children derivations until unknown mappings between all identifiers are identified.

In this case, the mappings between identifiers may be determined and hence the network topology may be determined without any prior knowledge of the network topology.

The measurement processor 808 of FIG. 8, is arranged to use the identifiers for the received measurements to determined network topology.

Measurement storage 809 is provided and is arranged to store the measurements before root cause analysis is performed on the measurements by the root cause analyser 810.

A measurement may be received as a measurement report, which may comprise an identifier and an associated measurement. The identifier may be extracted from this report and a network topology may be determined using the extracted identifier. The measurement storage 809 may be arranged to store the measurement reports and/or the extracted identifiers.

In embodiments of the present invention, in order to consider R-KPIs, connection object types and procedure object types may be considered for root cause analysis.

Connections provide a communication channel between two entities that need to communicate. The connection may apply to different structures in a network—both the User plane and the Control plane use connections.

Procedures provide set-up, maintenance and teardown of connections. Procedures use connections both shared with User plane and dedicated connection for Control Plane.

Figure 11:
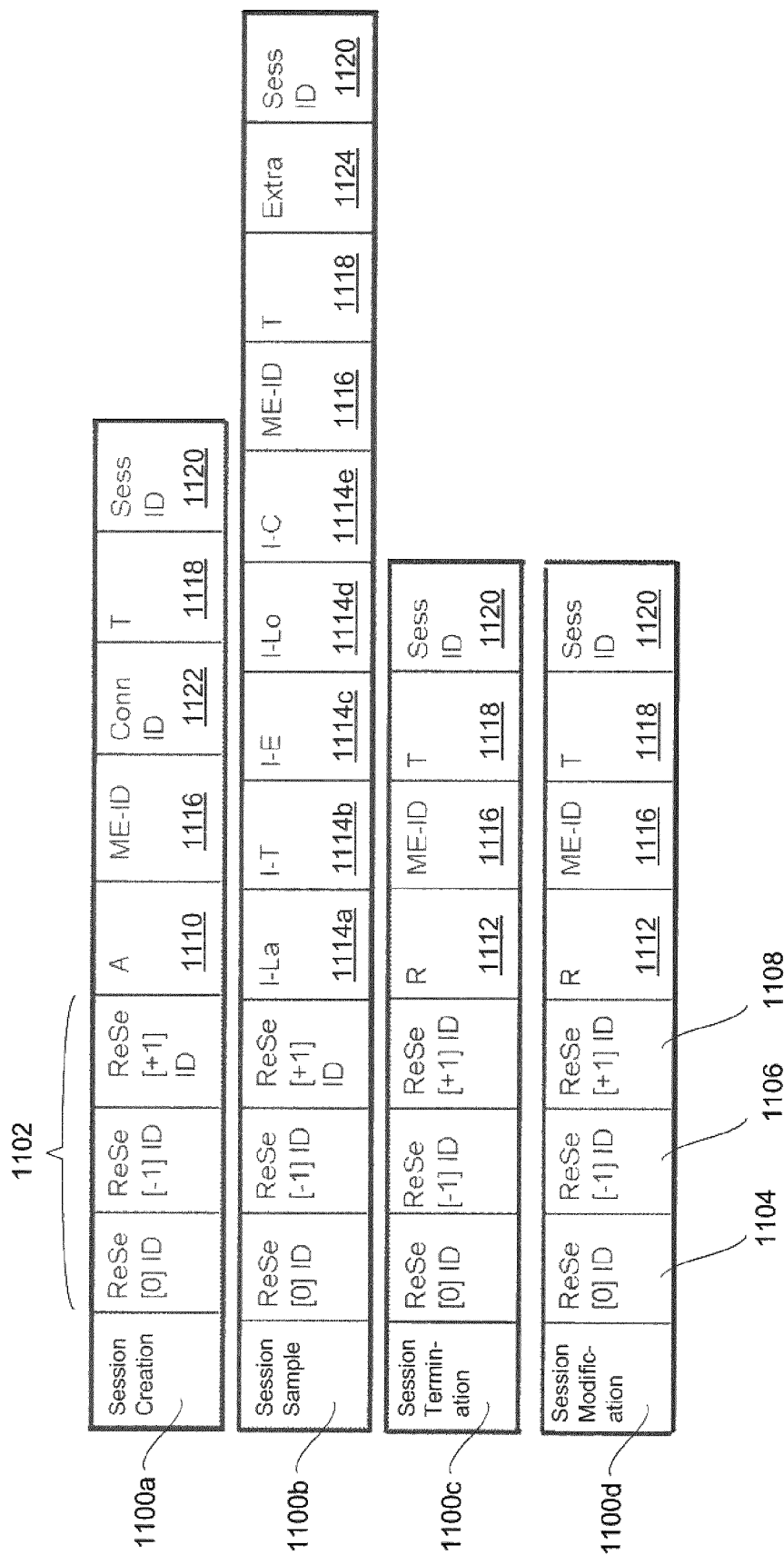
FIG. 11 shows example connection measurement reports.

FIG. 11 illustrates connection measurement reports that may be generated for connection based R-KPIs and may be used by the root cause analyser 810 of FIG. 8.

As can be seen in FIG. 11, four types of connection reports 1100a to 1100d are provided, each associated with a different connection event.

Connection measurement report 1100a is related to a session creation measurement event. This measurement event is associated with accessibility, which is the system's ability to provide a service upon the user's request.

Connection measurement report 1100b is related to a session sample measurement event. This measurement event is associated with integrity, which is the quality of the service as perceived by the user. As the name implies during the session sample measurement event quality of a resource service during the course of its use in a system service deliverance is sampled. The sample interval shall be configurable and is system service dependent.

Connection measurement report 1100c is related to a session termination measurement event. This measurement event is associated with retainability, which is the system's ability to provide a service session that is as long as the user needs it to be.

Connection measurement report 1100d is related to a session modification measurement event. Like connection measurement event 1100c, this measurement event is associated with retainability.

As can be seen in FIG. 11, all of the connection measurement reports 1100a to 1100d comprise a resource service identifier (ReSe ID) 1102, a managed element identifier (ME-ID) 1116 that indicates the managed element/node which the event came from, a time (T) 1118 for the measurement, and a session identifier (Sess ID) 1120.

The session creation measurement report 1100a further comprises an accessibility field 1110, which indicates if the measurement event is usable or not. The measurement report 1100a may also further comprise a connection identity reference 1122.

The session sample measurement report 1100b further comprises at least one integrity field 1114a to 1114e. The integrity field may comprise a latency 1114a, an observed payload 1114b, an error 1114c, loss rate 1114d, or throughout capacity 1114e. The measurement report 1100b may further comprise an extra field 1124. For the resource service integrity the measurement is not an individual event but a train of events or samples. During a resource service session the throughput, latency, error rate, loss rate, and available capacity are sampled to provide a view of the performance of the resource service during a session.

The session termination measurement report 1100c further comprises a retainability field 1112, which indicates if a user session has ended.

The ReSe ID identifies to which resource service the measurement event belongs. The Session ID links the resource service to a particular System Service (SySe) session. The system service session ID is not captured by the network element and can only be derived through correlation in an external system such as the OSS.

In a preferred embodiment a measurement event belonging to Resource Service n has additional identifiers for the Resource Service n−1 that depends on the Resource Service n and for the Resource Service n+1. The Resource Service n, in turn, depends on the Resource Service n+1.

As can be seen in FIG. 11, the resource service identifier 1102 comprises three fields. A first field 1104, ReSe [0] ID, is an identifier to a current connection object, in other words, the connection object which the measurement was received from. A second field 1106, ReSe [−1] ID, is an identifier to a connection object that depends on the current connection object, in other words, the connection object at the layer below the current connection object. A third field 1108, ReSe [+1] ID, is an identifier to a connection object on which the current connection object is dependent, in other words, the connection object at the layer above the current connection object.

Having the resource service identifier 1102 with three fields as described above allows for determining the topology of the network by analysing the identifiers. With ReSe [0] ID, ReSe [−1] ID and ReSe [+1] ID dependencies of various connection objects can be determined. In a real life network with thousands of measurement reports received there will be identifiers pointing to a connection object [+1] on which their current connection object [0] depends, but they will have pointers to a connection object [−1] that depends on the current connection object. And vice versa, there will be a number of current connection objects [0] having pointers to the same connection object [−1] depending on these current connection objects. By analysing these dependencies, determined from the identifier fields 1104-1108, it is possible to determine the topology of the network. It is similar to building a structure without using any plan from building blocks with each building block containing its own ID and IDs (pointers) of building blocks that are to be connected to it.

Figure 12:
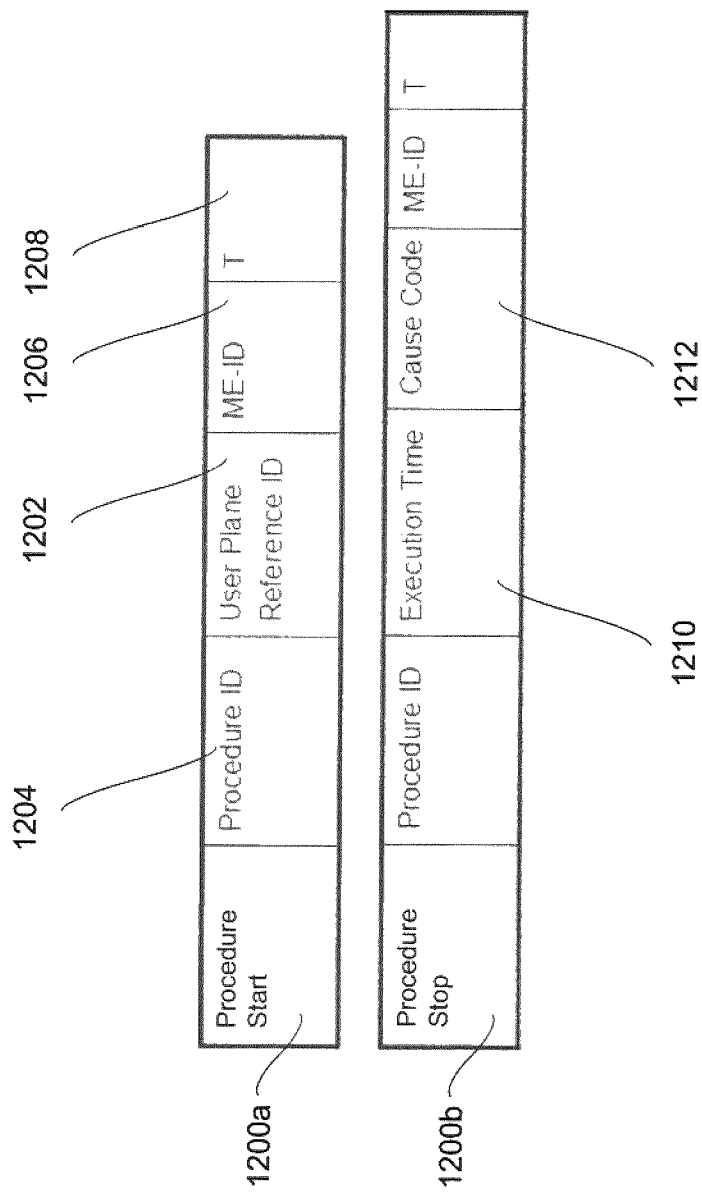
FIG. 12 shows example procedure measurement reports.

FIG. 12 illustrates procedure measurement reports that may be generated for procedure based R-KPIs and may be used by the root cause analyser 810 of FIG. 8.

Control plane procedures are invoked by user action or network action. Those procedures invoked by user action are related to the user plane, the relation between the user plane and the control plane is contained in a user plane reference identifier 1202.

In order to measure the performance of a procedure, the time a procedure takes (procedure execution time) or the result of the procedure (successful, if not successful why not), could be measured.

Also, as control messages are sent between nodes, a control message will have some sort of reply from the node the message is sent to. Therefore, the time for a message to get a reply (messages can time out, in which case the message is resent) or the time between messages belonging to same procedure can be measured.

The performance of a procedure that is modelled as an object is expressed in the following R-KPI's, namely duration (procedure execution time) and success (successful completion of procedure). An R-KPI shows if a procedure was successful or not by providing a cause code. The cause code is part of the measurement meta data and indicates the reason for a procedure stop. For example, cause code might be OK, failed-CC1, failed-CC2, failed-CC3 . . . , timed out etc., where cause codes CC1 . . . CC3 . . . are associated with different reasons for procedure stop.

As can be seen in FIG. 12, two types of procedure measurement report 1200a and 1200b may be provided.

Procedure measurement report 1200a is related to a procedure start measurement event, and procedure measurement report 1200b is related to a procedure stop measurement event.

Procedure start measurement report 1200*a* comprises a User Plane Reference identifier 1202, which links the measurement event to the user plane.

Procedure measurement report 1200*b* comprises an execution time 1210 and a cause code 1212.

Both procedure start measurement report 1200*a* and procedure stop measurement report 1200*b* comprise a procedure ID 1204, a managed element identifier (ME-ID) 1206 and a time (T) 1208 for the measurement.

By providing a user plane identifier in the procedure report, the procedure reports are self-describing in that they specify the relation between the user plane and the control plane.

An important advantage of this solution is that the impact on bad connectivity and its impact on call/session control (rather than the actual information received/exchanged) can be realised. This impacts for example accessibility, but can also affect integrity (channel switching time) and/or retainability (if the control plane is down, the associated data plane may be released by the control side due to inability to charge/bill etc, e.g. the current TV service will continue, but the user will not be able to change a channel).

Embodiments of the present invention provide identifiers for measurements that enable an external system (OSS) to relate how resource services have been combined in order to support an end user session. The solution applies to the connectivity objects in a resource model.

The model for the connectivity objects in the user plane and control plane are structured in a way that the relations between the network nodes and network functions are known.

Figure 13:
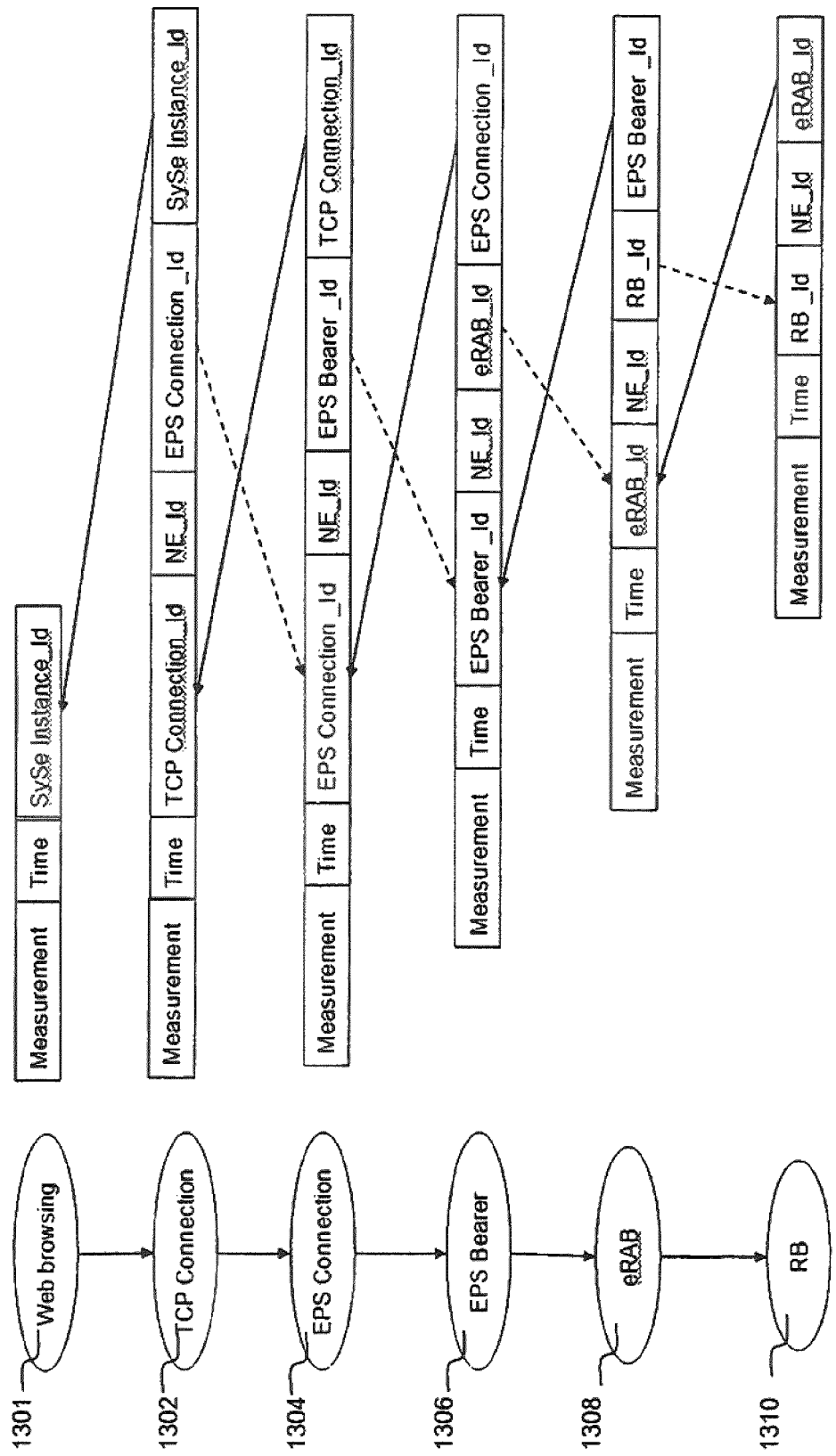
FIG. 13 shows and example of how identifiers can relate connection objects to each other.

FIG. 13 shows an example of how identifiers can relate connection objects to each other. FIG. 13 shows how identifiers in a measurement report can be used to relate connection objects to each other at different depths in a network system.

FIG. 13 shows a transmission control protocol (TCP) connection object 1302, an evolved packet system (EPS) connection object 1304, an EPS bearer connection object 1306, a EUTRAN Radio Access Bearer (eRAB) connection object (1308) and a radio bearer (RB) connection object 1310.

The eRAB 1308 is between a user equipment (UE) and a serving gateway (SGW), the layer below is the radio bearer and the layer above is the EPS bearer. Typical measurements taken include packet delay, throughput, packet loss.

As mentioned earlier, a measurement event belonging to Resource Service n has additional identifiers for the Resource Service n−1 that depends on the Resource Service n and for the Resource Service n+1. The Resource Service n, in turn, depends on the Resource Service n+1. The identifiers for the Resource Service n+1 and Resource Service n−1 are also pointers because they direct (point) to a resource service (n+1) on which the current resource service depends and a resource service (n−1) which, in turn, depends on the current resource service.

In the example illustrated in FIG. 13, the measurement report associated with the eRAB 1308, contains an identifier, eRAB_Id, for the current connection object; there is also an identifier, RB_Id, for a connection object on which the eRAB connection object depends and a third identifier, EPS Bearer_Id, for a connection object that is dependent on the eRAB connection object. The direction of arrows in FIG. 13 represent the direction of dependency.

Similarly, the measurement report associated with the EPS bearer 1306 contains an identifier, EPS Bearer_Id, for the current connection object. EPS Connection_Id is an identifier for a connection object that is dependent on the EPS Bearer connection object. Finally, the eRAB_Id is an identifier for a connection object on which the EPS Bearer connection object depends.

The measurement report associated with the EPS connection 1304 contains an identifier, EPS Connection Id, which is the identifier of the current connection object. A second identifier in the measurement report associated with the EPS connection 1304 is TCP Connection_Id, which is an identifier of a connection object that is dependent on the EPS Connection connection object. A third identifier is EPS Bearer_Id and it identifies a connection object on which the EPS Connection connection object depends.

In a similar fashion the measurement report associated with the TCP connection 1302 contains an identifier TCP connection_Id for the current connection object. SySe Instance_Id is an identifier of a connection object that is dependent on the TCP Connection connection object and EPS Connection_Id identifies a connection object on which the TCP Connection connection object depends.

The measurement report associated with the radio bearer RB 1310 contains an identifier RB_Id for the current connection object as well as an identifier eRAB_Id, which is an identifier of a connection object, eRAB 1308, which is dependent on the RB connection object.

At the top of this structure is the System Service that depends on the Resource Service. In the example illustrated in FIG. 13 Web browsing 1301 depends on TCP Connection 1302.

The information about the model is contained in the network architecture and the measurement pointers. In other words, the self-describing measurements provide the necessary relational information for root cause analysis to be performed. This relational information is only available inside the Network Entities (NEs) and is not possible to obtain by probing the communication line.

The measurements from all network resources are continuously collected, and after sufficient measurements from all resources have been received, an algorithm can create a dependency model for the active, measured network. The dependency model will increase the speed of which RCA can be performed as well as being the base for (automatic) definition of budgets for performance aspects that have additive properties and can help an operator to browse through the measurements for the S-RCA. In other words, the network topology may be created based on the measurements, and this network topology may be stored for later use. If the network topology changes, the stored topology could be automatically updated.

When there is no stored model of the network topology, all measurements have to be analyzed each time S-RCA is done. A stored model will reduce this step as the model will point to the measurements that are applicable to the S-RCA.

Figure 14:
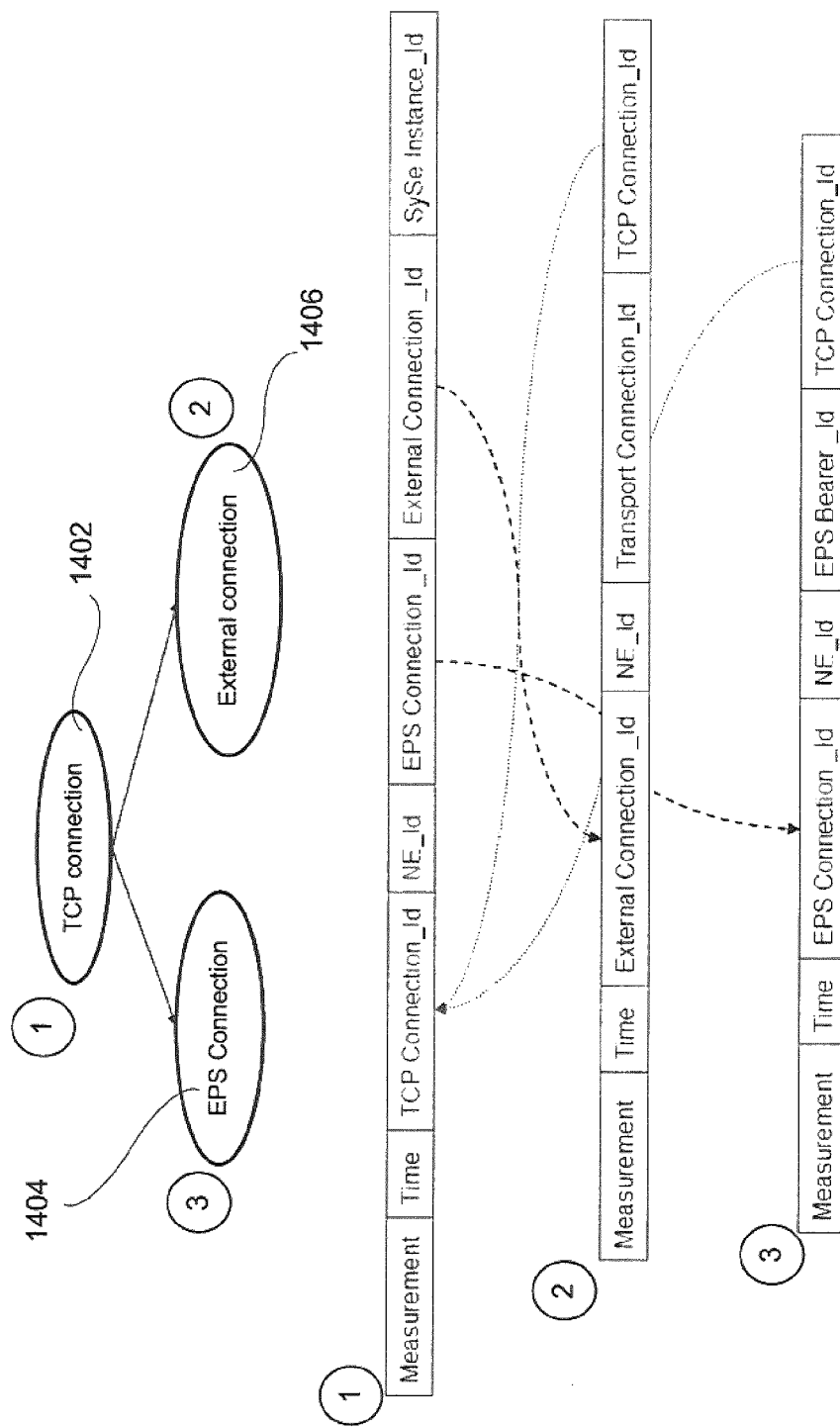
FIG. 14 shows another example of how identifiers can relate connection objects to each other.

FIG. 14 shows another example of how identifiers can relate connection objects to each other. FIG. 14 shows how identifiers in a measurement report can be used to relate connection objects to each other across a width of layer in a network system.

FIG. 14 shows a transmission control protocol (TCP) connection object 1402, an evolved packet system (EPS) connection object 1404, and an external connection 1406. The EPS connection object 1404 may relate to a network resource that a network provider has control over and the external connection 1406 may relate to an external resource that the network provider does not have control over, such as an internet web site.

As can be seen in FIG. 14, the measurement report associated with the TCP connection 1402 contains a pointer/identifier, SySe Instance_Id, to the System Service instance it supports and a pointer/identifier, EPS Connection_Id, to the EPS connection it is dependent on and a pointer/identifier, External Connection_Id, to the external connection it is dependent on, as well as a pointer/identifier to the current connection object (TCP Connection).

The measurement report associated with the EPS connection 1404 contains an identifier, TCP Connection_Id, to the TCP connection it supports and an identifier, EPS Bearer_Id, to the EPS bearer it is dependent on, as well as an identifier, EPS Connection_Id, to the current connection object (EPS Connection).

The measurement report associated with the External connection 1406 contains an identifier, TCP Connection_Id, to the TCP connection it supports and an identifier, Transport Connection_Id, to the Transport Connection it is dependent on, as well as an identifier, External Connection_Id, to the current connection object (External Connection).

It should be appreciated that the network element identifier (NE_Id) of FIGS. 13 and 14, correspond to the managed element identifiers (ME-Id) of FIGS. 11 and 12.

Compared to measurements collected from nodes in current systems, the measurement reports of embodiments of the present invention are self-describing in the context of service diagnosis, enriched with measurement contexts such as connection identifiers.

Embodiments of the invention describe a method, algorithms and functions for root cause analysis by reporting and processing measurements from multiple layers of a telecommunication system. Measurements may be enriched with their contextual relation information (such as connection or resource identifiers and traffic converging/diverging information) as parameters, which may be used in measurement processing. The measurements may be enriched by filtering, linking and aggregating the measurements based on the contextual relation information, which further facilitates problem diagnosis and root cause analysis.

Root cause analysis may be performed using the enriched measurements, by mapping collected measurements onto a connectivity model instance, to identify the resource service(s) that has the most negative impact on the combined resulting experienced service quality, as seen by an end user. The enriched measurements can also be used, by integrating connectivity models into measurement reporting events, such that that the connectivity model of the network is automatically identified and kept up to date.

Embodiments of the present invention use measurements for root cause analysis. In these embodiments the measurement is followed by meta data specified in a way that the measurement serve as input to an RCA system that automatically identifies and keeps the connectivity model of the network up to date. An RCA algorithm implemented in the RCA system is to identify the main contributor(s) in the resources domain which is the reason for quality degradation in a service consumption session.

By combining measurements with contextual relation information, so that measurements are self-contained, the need to look up multiple data sources when analyzing measurements may be eliminated and root cause analysis based on such measurements may be facilitated. This provides the advantage that there is no need for a model in the measurement system to evaluate and understand the content of the measurement, as the measurements are self contained.

Also, there is no need to update a model when a network is rearranged or expanded, as the contextual relation information for the measurements automatically adapts to network changes/expansions, thereby reducing operational expenditure and erroneous analysis results as a consequence of such a change.

Further, a network connectivity model may be built and presented by the management system.

Furthermore, by observing the R-KPI measurements and correlating them to S-KPI and defined quality thresholds, a system may itself establish a budget and as such, thresholds for individual R-KPIs for none additive R-KPI like e.g. delay.

The invention is also advantageous as it provides a generic connectivity resource service R-KPIs for a set of measurement that supports reuse and efficient implementation of the measurement system.

The invention is further advantageous as the connectivity entities and thus the R-KPIs, are based on communication system standards which supports multi vendor integration.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for root cause analysis of service quality degradation in a communications network, the method comprising:
   receiving measurements from a plurality of nodes in the communication network;
   determining one or more identifiers for the received measurements, the one or more identifiers comprising pointers to connection objects, each connection object representing a connection in the communications network;
   using the one or more identifiers for the received measurements to determine a network topology by analyzing the identifiers; and
   performing a root cause analysis based on the determined network topology and the measurements linked with said determined network topology.

2. The method according to claim 1, wherein the one or more identifiers comprise a resource service identifier, said resource service being a logical or physical entity adapted to deliver technology-independent service to be experienced by an end user.

3. The method according to claim 2, wherein the resource service identifier comprises a first resource service identifier indicating a current connection object, wherein the current connection object is a connection object from which a measurement was received, a second resource service identifier indicating a connection object on which the current connection object depends, and a third resource service identifier indicating a connection object that is dependent on the current connection object.

4. The method according to claim 3, wherein the third resource service identifier indicates an internal connection object and an external connection object in a layer below the current connection object, wherein the external connection object is related to an external resource that a network provider does not control.

5. The method according to claim 1, wherein the one or more identifiers further comprise a user plane reference identifier, wherein the user plane reference identifier identifies a relation between a user plane and a control plane.

6. The method according to claim 1, wherein a measurement is received as a measurement report comprising the one or more identifiers and associated measurement.

7. The method according to claim 6, wherein the determining the one or more identifiers for the received measurements comprises extracting the one or more identifiers from the measurement report.

8. The method according to claim 1, wherein the determining the one or more identifiers for the received measurements comprises requesting an identifier for a measurement from one of the plurality of nodes that provided the measurements, and receiving the identifier from said node.

9. The method according to claim 1, wherein the determining one or more identifiers comprises reading information about part of the network topology from a file.

10. The method according to claim 1, wherein the network topology is determined based on mapping between the one or more identifiers received in the measurements.

11. An apparatus for providing root cause analysis of service quality degradation in a communications network, comprising:
   an adapter arranged to receive measurements from a plurality of nodes in the communications network, and arranged to determine one or more identifiers for the received measurements, the one or more identifiers comprising pointers to connection objects, each connection object representing a connection in the communications network;
   a measurement processor arranged to analyze the one or more identifiers for the received measurements to determine a network topology; and
   a root cause analyser arranged to perform root cause analysis based on the determined network topology and the measurements linked with said determined network topology.

12. The apparatus according to claim 11, wherein the adapter is arranged to extract one of the one or more identifiers from a measurement report in which a measurement is received.

13. The apparatus according to claim 11, wherein the adapter is arranged to request an identifier from the one or more identifiers for a measurement from one of the plurality of nodes that provided the measurements and receive the identifier from said node.

14. The apparatus according to claim 11, adapted to read the network topology from a file.

15. The apparatus according to claim 11, wherein the adapter is arranged to determine the network topology based on mapping between the one or more identifiers received in the measurements.

16. A communications network, comprising:
   a plurality of nodes; and
   an apparatus for providing root cause analysis, the apparatus comprising:
   an adapter arranged to receive measurements from a plurality of nodes in the communications network, and arranged to determine one or more identifiers for the received measurements, the one or more identifiers comprising pointers to connection objects, each connection object representing a connection in the communications network;
   a measurement processor arranged to use the one or more identifiers for the received measurements to determine a network topology; and
   a root cause analyser arranged to perform root cause analysis based on the determined network topology and the measurements linked with said determined network topology.

17. The communications network according to claim 16, wherein the adapter is arranged to extract one of the one or more identifiers from a measurement report in which a measurement is received.

18. The communications network according to claim 16, wherein the adapter is arranged to request an identifier from the one or more identifiers for a measurement from one of the plurality of nodes that provided the measurements and receive the identifier from said node.

19. The communications network according to claim 16, wherein the network topology is read from a file.

20. The communications network according to claim 16, wherein the adapter is arranged to determine the network topology by mapping between the one or more identifiers received in the measurements.

21. The communications network according to claim 16, further comprising at least one measurement system.

22. The method of claim 1, wherein the connection objects comprise one or more of: a Transmission Control Protocol (TCP) connection object, an Evolved Packet System (EPS) connection object, an EPS bearer connection object, an EUTRAN Radio Access Bearer (eRAB) connection object, and a Radio Bearer (RB) connection object.

* * * * *

UNITED STATES PATENT AND TRADEMARK OFFICE
CERTIFICATE OF CORRECTION

PATENT NO. : 9,712,415 B2  
APPLICATION NO. : 14/348862  
DATED : July 18, 2017  
INVENTOR(S) : Groenendijk et al.

Page 1 of 1

It is certified that error appears in the above-identified patent and that said Letters Patent is hereby corrected as shown below:

In the Specification

In Column 3, Line 22, delete "according" and insert -- according to --, therefor.

In Column 3, Line 24, delete "according" and insert -- according to --, therefor.

In Column 3, Line 26, delete "according" and insert -- according to --, therefor.

In Column 3, Line 28, delete "according" and insert -- according to --, therefor.

In Column 3, Line 40, delete "shows and example" and insert -- shows an example --, therefor.

In Column 10, Line 53, delete "R-KPI's," and insert -- R-KPIs, --, therefor.

Signed and Sealed this  
Thirty-first Day of October, 2017

Joseph Matal  
*Performing the Functions and Duties of the*  
*Under Secretary of Commerce for Intellectual Property and*  
*Director of the United States Patent and Trademark Office*